United States Patent [19]

Camilleri

[11] Patent Number: 4,823,495
[45] Date of Patent: Apr. 25, 1989

[54] FISHING LINE DEFLECTING MEMBER

[76] Inventor: Jonathan P. Camilleri, 2 Audrelane Court, Scarborough, Ontario, Canada, M1V 3S4

[21] Appl. No.: 54,847

[22] Filed: May 27, 1987

[51] Int. Cl.⁴ ............................................. A01K 91/06
[52] U.S. Cl. .................................. 43/43.13; 43/42.05; 43/42.36; 43/42.49; 43/44.88
[58] Field of Search ................. 43/42.05, 42.36, 42.49, 43/42.5, 43.13, 44.88, 42.18

[56] References Cited

U.S. PATENT DOCUMENTS

| | | | |
|---|---|---|---|
| 3,568,351 | 3/1971 | Perrin | 43/43.13 X |
| 2,181,254 | 11/1939 | Wilson | 43/42.05 |
| 2,861,381 | 11/1958 | Snyder | 43/42.5 X |
| 3,153,298 | 10/1964 | Lemon | 43/43.13 X |
| 3,205,608 | 9/1965 | Dickinson | 43/42.05 X |
| 3,230,658 | 1/1966 | Wuotila | 43/42.36 X |
| 3,388,495 | 6/1968 | Minser | 43/42.05 |
| 3,543,430 | 12/1970 | Brokaw | 43/42.05 |
| 3,834,058 | 9/1974 | Gaunt | 43/42.49 X |
| 4,134,224 | 1/1979 | Clark | 43/42.05 |
| 4,380,131 | 4/1983 | Lazan, Jr. | 43/43.13 X |
| 4,507,892 | 4/1985 | Ochs | 43/42.18 |
| 4,642,933 | 2/1987 | Brown | 43/42.36 |

FOREIGN PATENT DOCUMENTS

| | | | |
|---|---|---|---|
| 629515 | 10/1961 | Canada | 43/42.5 |
| 188958 | 3/1957 | Fed. Rep. of Germany | 43/42.5 |
| 114782 | 9/1945 | Sweden | 43/43.13 |
| 718666 | 11/1954 | United Kingdom | 43/42.5 |
| 1548372 | 7/1979 | United Kingdom | 43/42.36 |

Primary Examiner—Nicholas P. Godici
Assistant Examiner—Carmine Cuda

[57] ABSTRACT

The present invention provides a fishing line deflector member which slideably fits onto a fishing line. The deflector member comprises a deflector plate having a series of spaced apart openings for slideably receiving, while resisting wear on the fishing line, from one opening to the next through the plate.

4 Claims, 2 Drawing Sheets

FISHING LINE DEFLECTING MEMBER

FIELD OF THE INVENTION

The present invention relates to a deflecting member in the form of a dodger, lure or the like for fitting on a fishing line.

BACKGROUND OF THE INVENTION

Presently available fishing line deflector members in the form of dodgers or lures necessitate the cutting of the fishing line which is then tied to each end of the dodger or lure. This not only means that the line must be broken but the dodger or lure remains in a fixed position relative to the line and provides a resistance which a striking fish is then able to use for breaking the line between the hook and the dodger or lure.

SUMMARY OF THE PRESENT INVENTION

The present invention provides a fishing line deflecting member fittable on without breaking the fishing line. The deflecting member comprises a deflecting plate having at least two spaced apart openings with line wear resisting means at each of the openings for slideably receiving the fishing line from one opening to the next through the plate.

According to the present invention, the deflecting member is slideable backwards along the line so that when a fish strikes there is substantially no resistance in the direction in which the fish pulls which can otherwise be used to break the line.

BRIEF DESCRIPTION OF THE DRAWINGS

The above as well as other advantages and features of the present invention will be described in greater detail according to the preferred embodiments of the present invention in which.

DETAILED DESCRIPTION ACCORDING TO A PREFERRED EMBODIMENT OF THE PRESENT INVENTION

Figure 1:
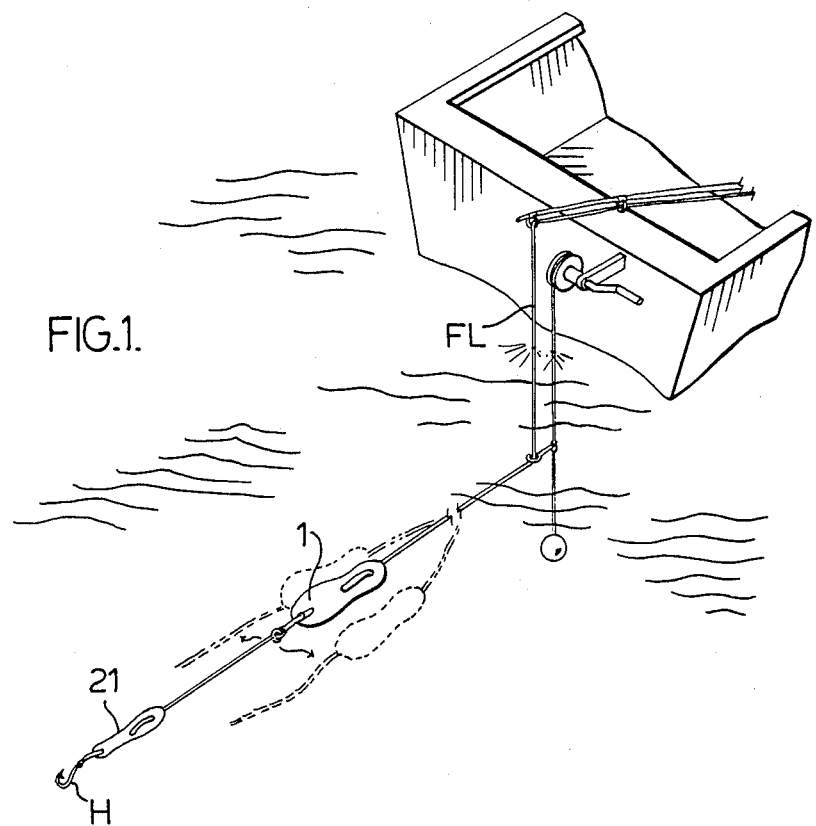
FIG. 1 is a perspective view from the rear of a trolling boat using a pair of fishing line deflector members i.e. a dodger and a lure according to a preferred embodiment of the present invention.

FIG. 1 shows a set-up used for trolling from the back of a fishing boat. According to this set-up a fishing line FL coming off of a rod runs down to a quick release connection secured to a weighted ball located in guiding the fishing line below water level behind the boat. In accordance with the present invention, a dodger 1 and a lure 21 are fitted to the line which is then completed with a hook H at the end of the line.

The unique concept of the present invention is that both the dodger and the lure which act as deflecting members to cause fish attracting movement of the line, are slideably mounted to the line without having to break the fishing line.

Figure 4:
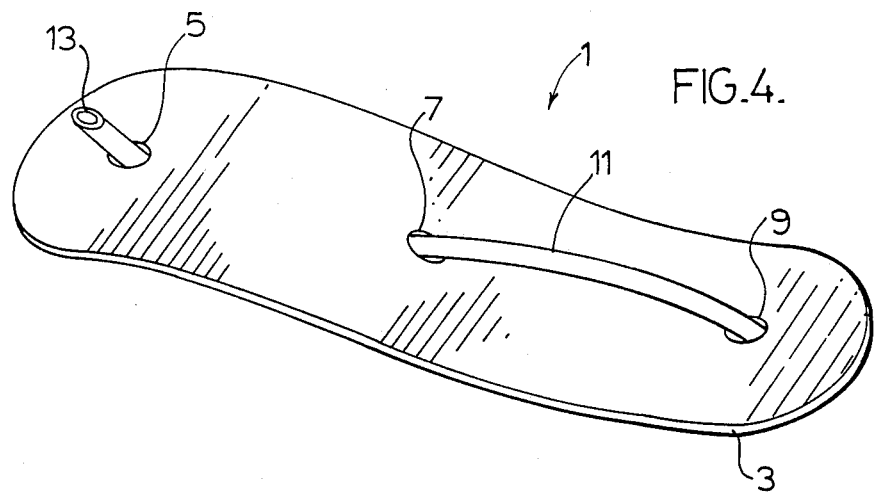
FIG. 4 is an enlarged perspective view of the dodger fitted to the fishing line of FIG. 1.
Figure 5:
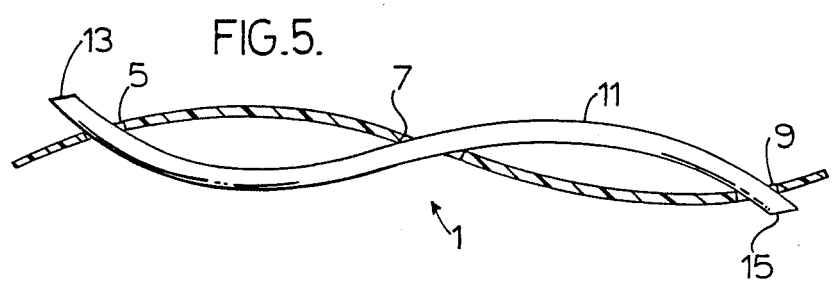
FIG. 5 is a side view of the lure of FIG. 4.

The details of dodger 1 are best seen in Figs. 4 and 5 of the drawings. In particular the dodger comprises a main deflector plate 3 which resists flowing through the water and causes a deflection of the fishing line. Plate 3, which is preferably made from a flexible plastic material, has a series of spaced apart openings 5, 7 and 9. Fitted through all three of these openings is a flexible tube 11 which frictionally engages deflector plate 3 where it passes through the openings. This tube provides both a line guide and isolates the fishing line from direct contact with the edges of the plate openings which might otherwise result in wearing or fraying of the fishing line. As will be seen particularly well in FIG. 5, the tube itself is provided with shaped ends 13 and 15 cut generally in the plane of plate 3 to again eliminate any sharp edges to which the fishing line would otherwise be exposed.

The method of fitting the dodger to the fishing line is quickly and easily accomplished by simply passing the line through tube 11 without having to cut or otherwise break the line. The line is then knotted behind the dodger, i.e. between the dodger and the lure which prevents the dodger from sliding back through to the lure. However, the dodger remains essentially freely slideable towards the boat as will be described later in greater detail.

A particularly unique feature of the fitting of the tube through the deflector plate is that the plate can be bent to various different undulating or sine wave shaped angles due to its flexible plastic construction and it is then held in the selected angle by the frictional engagement with the flexible tube. The greater the angle to which the plate is bent the more it will deflect the line as it flows through the water.

A further feature of this arrangement is that the tube itself can be used as a timed dispenser for fish scent, etc. which is poured directly into the tube and which will disperse or feed the scent out into the water as the dodger is pulled along by the line.

Figure 6:
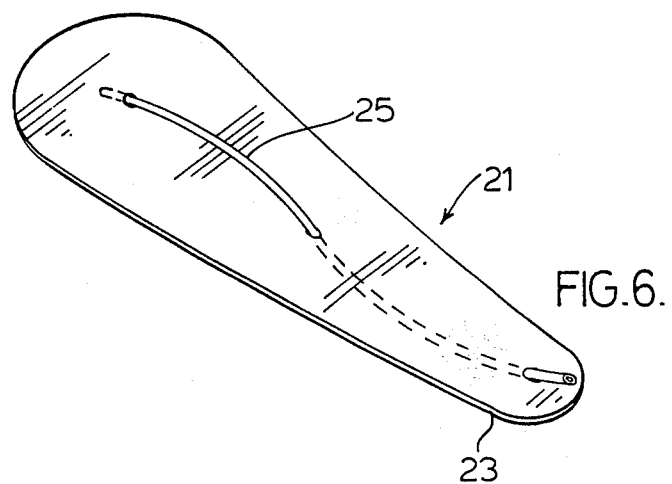
FIG. 6 is a perspective view of the lure fitted to the fishing line of FIG. 1.

FIG. 6 shows the details of the lure which has a slightly different shape from the dodger. More particularly, the lure includes a deflector plate 23, again preferably made from a flexible plastic material and held in various different bent positions by means of a flexible tube 25 fitted through a series of aligned openings along the length of plate 23.

Lure 21 is again mounted to the fishing line by simply passing the line through tube 25 with the line then being fitted with hook H to prevent the lure from sliding off the end of the line.

Although the embodiments shown in the drawings include a complete tube, it is to be appreciated that the wear or fray resisting means at each of the openings in the plate can be provided by a small bushing or similar edge smoothing means at each of the openings in the plate. In this case when not using a continuous tube the plate is formed with a permanent undulating configuration.

Figure 2:
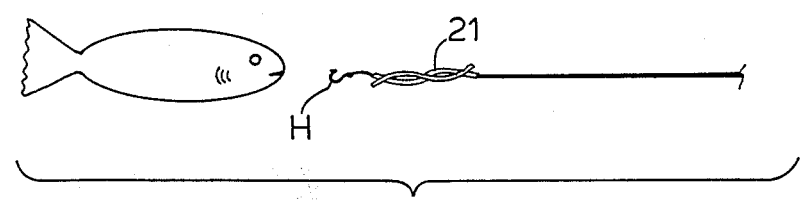
FIG. 2 shows a fish in a strike position relative to the fishing line of FIG. 1.
Figure 3:
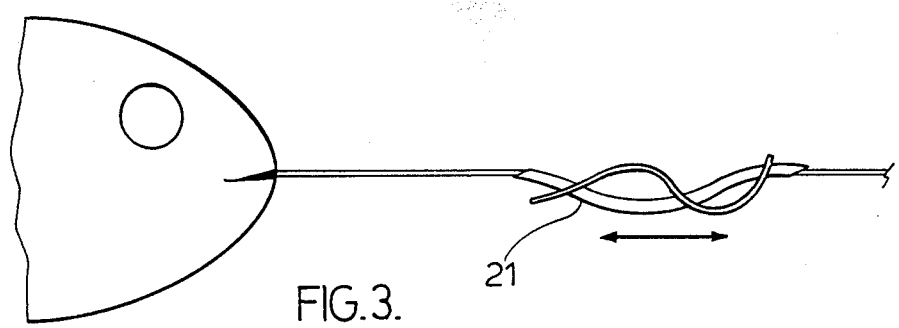
FIG. 3 is an enlarged view showing a fish striking the line of FIG. 2 and pulling the line relative to the lure fitted to that line.

When trolling, with the line being pulled through the water, dodger 1 will ride against the knot tied in the line while lure 21 will ride against hook H so that neither the dodger nor the lure will slide any further rearwardly and therefore each one provides a resistance to the line flowing through the water causing the line to deflect back and forth for attracting a fish to the hook. As the fish strikes it pulls sharply on the line. If the line is provided with a fixed deflecting member as is the case with a standard set-up, such a fixed deflecting member provides a resistance to the line movement which often results in line breakage. However, in accordance with the present invention this is not a problem because of the sliding relationship between the deflecting member and the fishing line. In particular, by comparing figures 2 and 3 it will be seen that before the strike lure 21 rides up against hook H whereas when the fish strikes it pulls the line which slides through the lure to essentially eliminate any resistance which the fish can otherwise use to break the line. The same is true of dodger 1 through which the fishing line is freely slideable in the direction of the pull as the fish strikes the line.

Although various preferred embodiments have been described in detail, it will be appreciated by those skilled in the art that variations may be made without departing from the spirit of the invention or the scope of the appended claims.

The embodiment of the invention in which an exclusive property or privilege is claimed are defined as follows:

1. A fishing line and dodger combination wherein said dodger comprises a line deflector plate slideably mounted on said fishing line, said deflector plate being flat from side to side thereacross and having a plurality of openings at longitudinally spaced locations centrally along said plate, said plate being fitted with a smooth wall tube fitted through and extending between said openings for a line resistant fitting of said line at said plate, said plate being bent in a sine wave configuration and said line passing centrally through said plate such that said plate is in a balanced position on said line.

2. A fishing line and dodger combination as claimed in claim 1, wherein said smooth wall tube has flattened ends substantially parallel to said dodger.

3. A fishing line and dodger combination as claimed in claim 2, wherein both said dodger and said smooth wall tube are flexible for bending to different deflecting positions.

4. A fishing line and dodger combination as claimed in claim 3, wherein said tube frictionally engages and holds said plate at said openings in said sine wave configuration.

* * * * *